United States Patent
Vajapey

[19]

[11] Patent Number: 5,842,028
[45] Date of Patent: Nov. 24, 1998

[54] METHOD FOR WAKING UP AN INTEGRATED CIRCUIT FROM LOW POWER MODE

[75] Inventor: Sridhar Vajapey, Sugarland, Tex.

[73] Assignee: Texas Instruments Incorporated, Dallas, Tex.

[21] Appl. No.: 729,936

[22] Filed: Oct. 15, 1996

[51] Int. Cl.⁶ .................................................. G06F 1/04
[52] U.S. Cl. ............................... 395/750.02; 395/750.03; 395/750.05; 395/750.08
[58] Field of Search ...................... 395/750.01, 750.03, 395/750.05, 750.02, 750.06, 750.08, 750; 364/948.8

[56] References Cited

U.S. PATENT DOCUMENTS

| | | | |
|---|---|---|---|
| 4,479,191 | 10/1984 | Nojima et al. | 364/707 |
| 4,902,917 | 2/1990 | Simpson | 307/465 |
| 4,906,862 | 3/1990 | Itano et al. | 307/296.3 |
| 4,961,012 | 10/1990 | Nishitani | 307/465 |
| 5,025,387 | 6/1991 | Frane | 364/493 |
| 5,129,091 | 7/1992 | Yorimoto et al. | 395/750.01 |
| 5,361,392 | 11/1994 | Fourcroy et al. | 395/800 |
| 5,410,714 | 4/1995 | Yorimoto et al. | 395/750.01 |
| 5,553,236 | 9/1996 | Revilla et al. | 395/750.01 |
| 5,561,614 | 10/1996 | Revilla et al. | 364/579 |
| 5,585,792 | 12/1996 | Liu et al. | 341/22 |

*Primary Examiner*—Glenn A. Auve
*Assistant Examiner*—Xuan M. Thai
*Attorney, Agent, or Firm*—Gerald E. Laws; Robert D. Marshall, Jr.; Richard L. Donaldson

[57] ABSTRACT

This is a method and apparatus for waking up an integrated circuit 10 which has been placed into a low power mode in response to an idle instruction or the like. A plurality of wakeup reset signals 320 and wakeup interrupt signals 330 are provided to wakeup circuitry 300 in order to initiate a wake-up process. Wakeup circuitry 300 conditions signals 320 and signals 330 so that a wake-up process is initiated only when the integrated circuit is in a low power mode; therefore, signals 320 and signals 330 can be used for other purposes when the integrated circuit is not in a low power mode. By such conditioning, no additional pins are required on integrated circuit 10 to provide a plurality of wake-up stimuli.

11 Claims, 7 Drawing Sheets

METHOD FOR WAKING UP AN INTEGRATED CIRCUIT FROM LOW POWER MODE

FIELD OF THE INVENTION

This invention is in the field of semiconductor integrated circuits and relates primarily to integrated circuits that have a low power, standby mode of operation.

BACKGROUND OF THE INVENTION

As integrated circuits (IC's) have been applied in applications which are battery powered, the need for energy conservation has resulted in providing the IC with a standby mode of operation in which power consumption is reduced. This is often accomplished by partitioning the IC into two circuit regions, a monitoring circuit region and a non-critical circuit region. When it is appropriate to put the IC in standby mode, clocking is stopped or significantly reduced in the non-critical region. Since power consumption in an IC, especially in complimentary metal on silicon (CMOS) IC's is proportional to the frequency of the clock, slowing or stopping the clock results in significant power savings. At an appropriate time, the monitoring circuit determines that the IC should resume full functionality and wakes-up the non-critical circuit by resuming normal clocking.

The event that causes the monitoring region to awaken the IC is often provided by a stimulus external to the IC and requires one or more pins on the IC package to transmit this external event to the monitoring circuit.

Therefore, there is a need for a method to wake-up an IC which does not require additional, expensive IC pins. Accordingly, it is an object of the invention to provide such a method.

Another object of the invention is to provide additional functionality without requiring the use of additional IC pins.

Other objects and advantages will be apparent to those of ordinary skill in the art having reference to the following figures and specification.

SUMMARY OF THE INVENTION

In accordance with the present invention, a method is provided for waking up an integrated circuit from a low power, standby mode which comprises enabling a signal on an interrupt pin to cause a wake-up operation. An input buffer for receiving an interrupt used during full power mode of the IC has additional circuitry to accept an interrupt during stand-by mode. An interrupt received while the IC is in stand-by mode is used to wake-up the IC and may also be used instruct the IC to service the interrupt once full power mode has been entered.

Another feature of the present invention is an input buffer for receiving a data signal or other non-interrupt type signal which has additional circuitry to accept an interrupt during stand-by mode which is used to wake-up the IC.

Another feature of the present invention is an input buffer for receiving a data signal or interrupt signal which has additional circuitry to accept a signal during stand-by mode which is used to perform a different function when in stand-by mode than when in fill power mode.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF PREFERRED EMBODIMENTS OF THE INVENTION

In a typical IC which is designed to have a low power, standby mode, an internal event such as a timer may periodically awaken the IC to perform processing at full power. Alternatively, an external event may be provided via a pin to awaken the IC. A method for awakening an IC in response to an external event has now been developed which does not require the use of additional pins.

Figure 1:
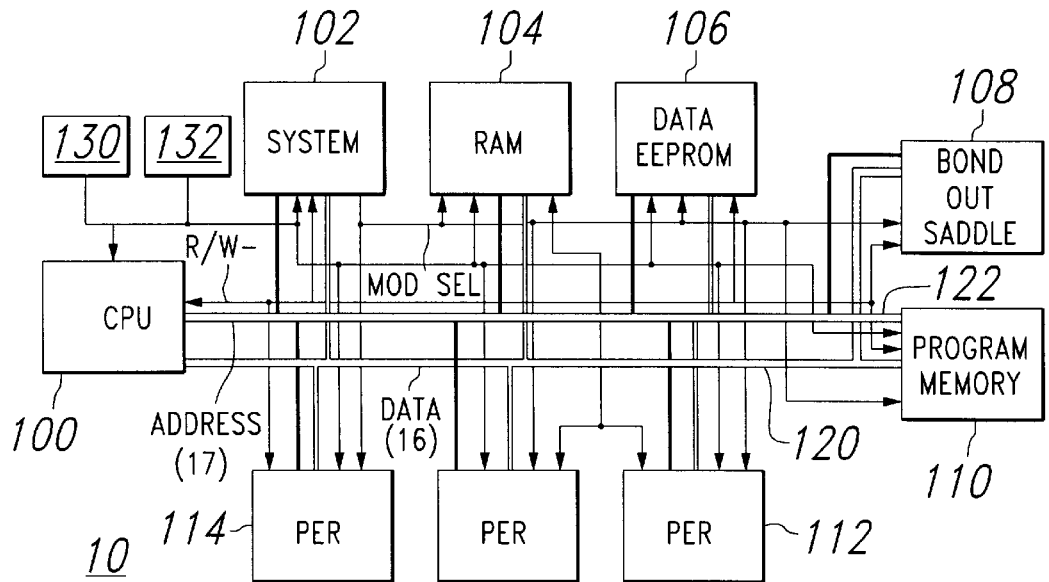
FIG. 1 is a block diagram of an integrated circuit which embodies the advantages of the present invention.

FIG. 1 is a block diagram of an integrated circuit 10 which embodies the advantages of the present invention. The integrated circuit of FIG. 1 is a custom application specific module (CASM). A CASM is typically custom designed using circuit blocks from a library of pre-designed circuit modules. These modules may be combined with additional custom designed circuitry by a designer for a specific application. This method of designing IC's results in economical IC's, even at relatively low production volumes. FIG. 1 illustrates a processor module 100, a random access data memory module 104, an electrically erasable read only memory 106, program memory 110 interconnected via address bus 120 and data bus 122. Various registers are in system module 102 and test circuitry is included in bond out saddle 108. A plurality of peripherals 112–114 may also be connected to buses 120 and 122.

In normal operation, IC 10 operates in response to a system clock 130 which operates at a preselected frequency, typically several megahertz, and consumes power which is proportional to the frequency of the system clock. A low power clock 132 which operates at a preselected frequency is used to operate monitoring circuitry for standby operation. In order to save power for power critical applications, the clocks may be stopped in response to an instruction executed by processor 100. Once the system clock is stopped, IC 10 enters a low power standby mode and processor 100 ceases operation.

Figure 2:
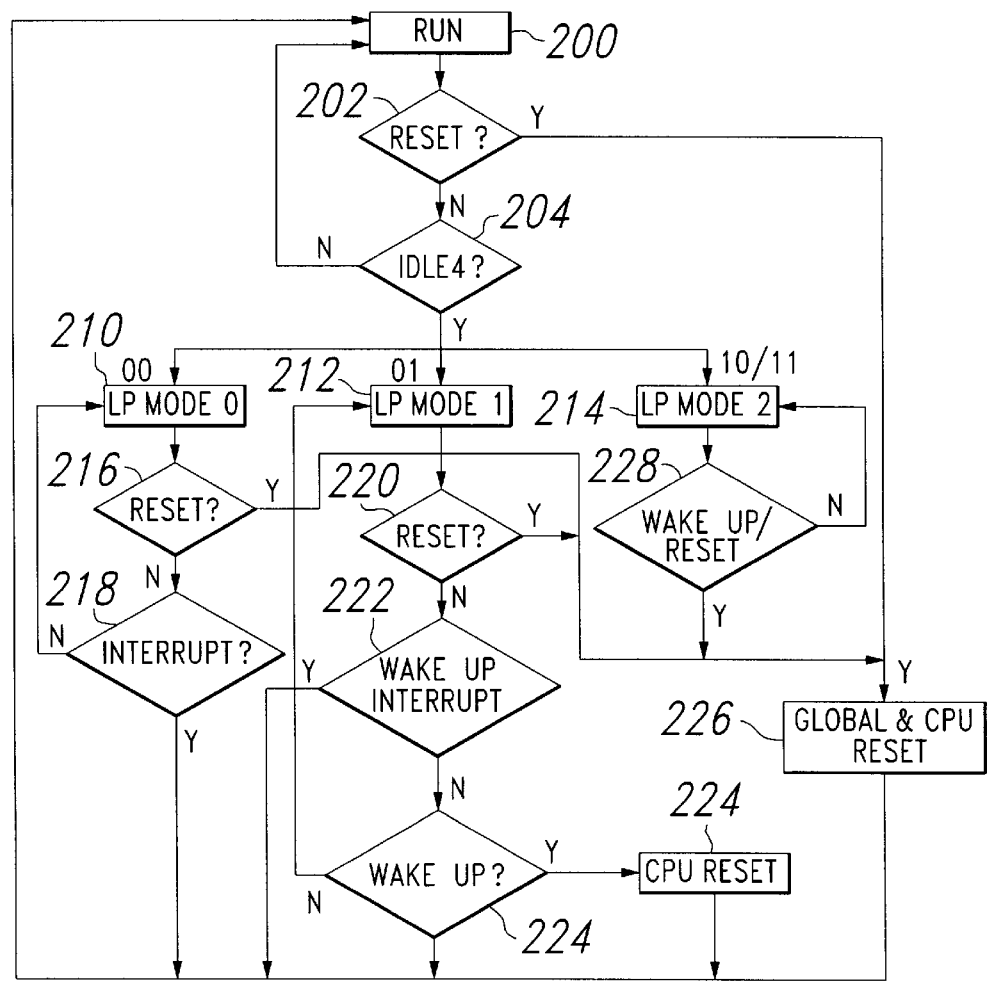
FIG. 2 is a flow chart of ways to wake-up the IC of FIG. 1.

FIG. 2 is a flow chart of various ways to wake-up IC 10 after it has entered standby mode. Processor 100 normally operates in run state 200 and executes various instructions provided by program memory 110. Prior to entering standby mode, processor 100 may designate what type of low power mode to enter by executing instructions which set appropriate bits in a register in system block 102. Different types of low power mode may have different ways of exiting back to full power mode. Processor 100 enters either low power modes 0, 1, 2, or 3 represented by states 210, 212, or 214 by executing an IDLE instruction which causes processor 100 to enter idle state 204.

IC 10 has low power mode 0 represented by state 210 in which all clocks continue to run, but the frequency of system clock 130 is reduced. In this mode, either a reset 216 or an interrupt 218 will cause processor 100 to return to run state 200. A reset 216 results in a system reset 226 which reset processor 100 and all other modules of IC 10. Processor 100 begins executing instructions after being reset at a preselected address. An interrupt 218 causes processor 100 to begin executing instructions at an address responsive to the type of interrupt.

Low power mode 1 represented by state 212 causes system clock 130 to be stopped, but low power clock 132 continues to run. In this mode, either a reset 220, a wakeup interrupt 222, or a wakeup reset 224 will put processor back in run state 200. Reset 220 will result in a system reset 226. Wakeup interrupt 222 will cause system clock 130 to be restarted. Processor 100 may either begin executing instructions at an address immediately after the IDLE instruction, or at an address responsive to the type of interrupt, as explained in more detail later. Wakeup reset 224 causes processor 100 to be reset which puts processor 100 back in run state 200.

Low power modes 2 and 3 represented by state 214 causes system clock 130 and low power clock 132 to be stopped. In this mode, a reset or wakeup reset will cause system reset 226 which puts processor 100 back in run state 200.

Figure 3:
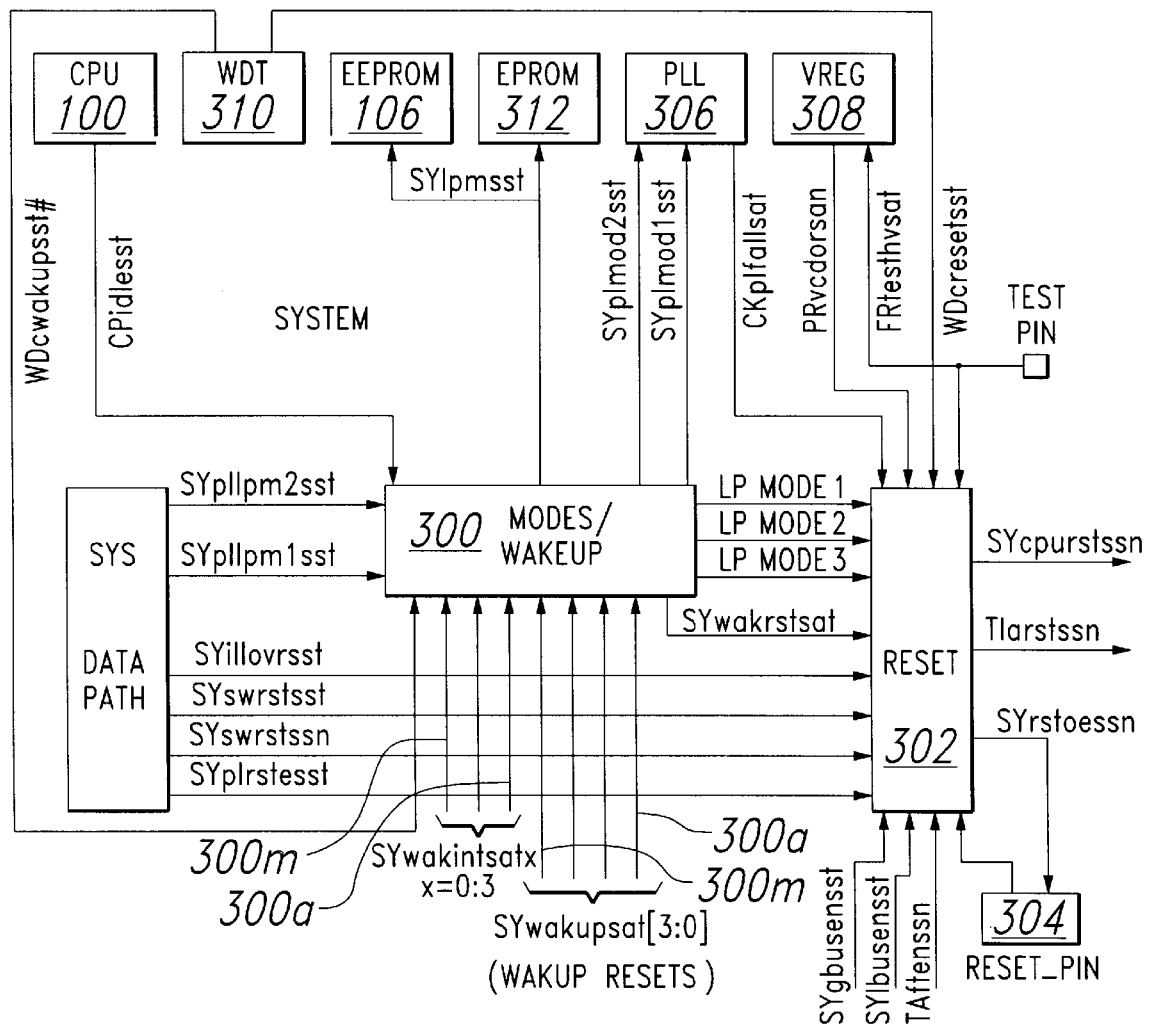
FIG. 3 is a block diagram of circuitry for implementing the flow chart of FIG. 2.

FIG. 3 is a block diagram of circuitry for implementing the flow chart of FIG. 2. Wakeup circuit 300 is connected to a plurality of wakeup interrupt signals SYwkinstat(0:3). One of the wakeup interrupts is connected to watch dog timer 310. Wakeup reset signals SYwakupsat(0:3) are also connected to wakeup circuit 300. Reset circuit 302 is connected to a plurality of sources which may generate a reset, such as external reset pin 304, phase locked loop 306, voltage regulator 308, etc.

Figure 4:
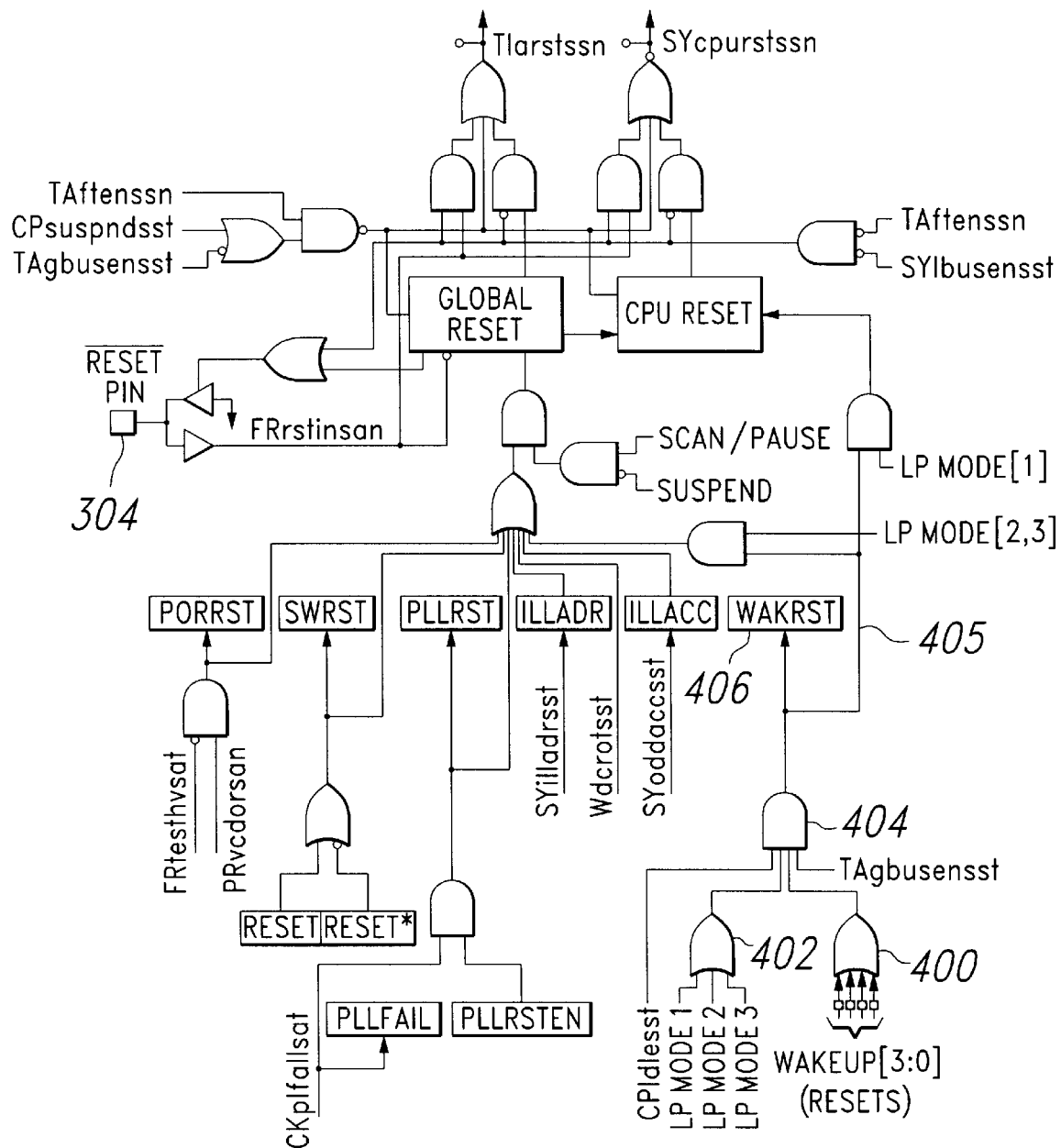
FIG. 4 is a partial schematic of circuitry to implement the RESET block of FIG. 3.

FIG. 4 is a partial schematic of circuitry to implement the RESET block of FIG. 3. AND gate 404 asserts signal 405 whenever IC 10 is in idle state 204 as indicated by signal Cpidlesst, and IC 10 is in low power mode 1–3 as indicated by signals LPMODE1-3, and any wakeup reset signal WAKEUP(0:3) is asserted. Depending on which low power mode is active, a processor reset signal SYcpurstssn or a global reset signal Tlarstssn will be asserted. A wakeup reset bit 406 is set in a system register so that processor 100 can discover that a reset was caused by a wakeup reset.

Figure 5:
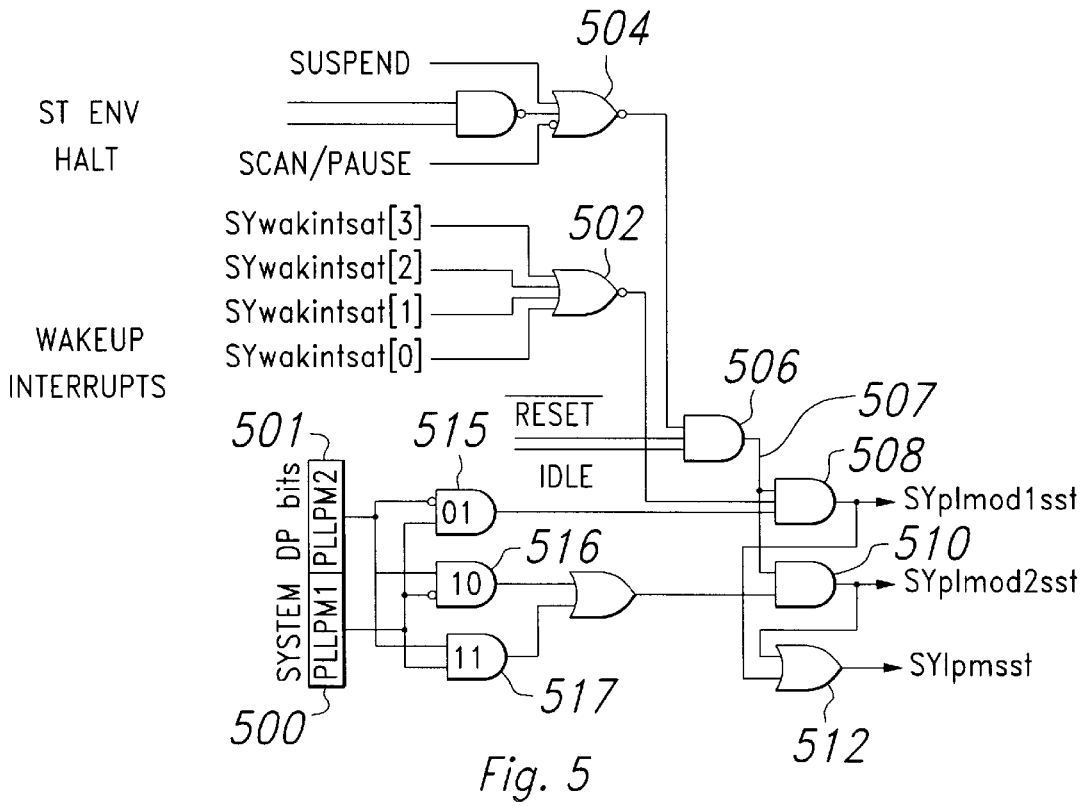
FIG. 5 is a schematic of circuitry to implement the MODES/WAKEUP block of FIG. 3.

FIG. 5 is a schematic of circuitry to implement the MODES/WAKEUP block of FIG. 3. Low power mode bits 500 and 501 part of a system register in system block 102 and are set by processor 100 to specify which low power mode is to exist when an IDLE instruction is executed. Wakeup interrupt signals SYwakintsat(0:3) are connected to NOR gate 502. AND gate 506 asserts signal 507 if processor 100 is not suspended (signal SUSPEND), or halted (signal HALT), or in test mode (signal SCAN/PAUSE), and not in reset (signal RESET) and in idle state 204 (signal IDLE). AND gate 508 asserts signal SYplmod1sst when AND gate 515 indicates that low power mode 1 is set. Likewise, AND gate 510 asserts signal SYplnod2sst when AND gates 516–517 indicate that low power mode 2 or 3 is set. Signals SYplmod1sst and SYplmod2sst are connected to phase lock loop 306 and cause system clock 300 to stop when either signal is asserted. Signal SYlpmsst is connected to EEPROM 106 and EPROM 312 and cause them to go into low power mode when asserted. When low power mode 1 is set and SYplmod1sst is asserted, any wakeup interrupt will cause NOR gate 502 to de-assert its output which will cause SYplmod1sst to be deasserted. System clock 300 will be restarted in response to SYplmod1sst being de-asserted.

Figure 6:
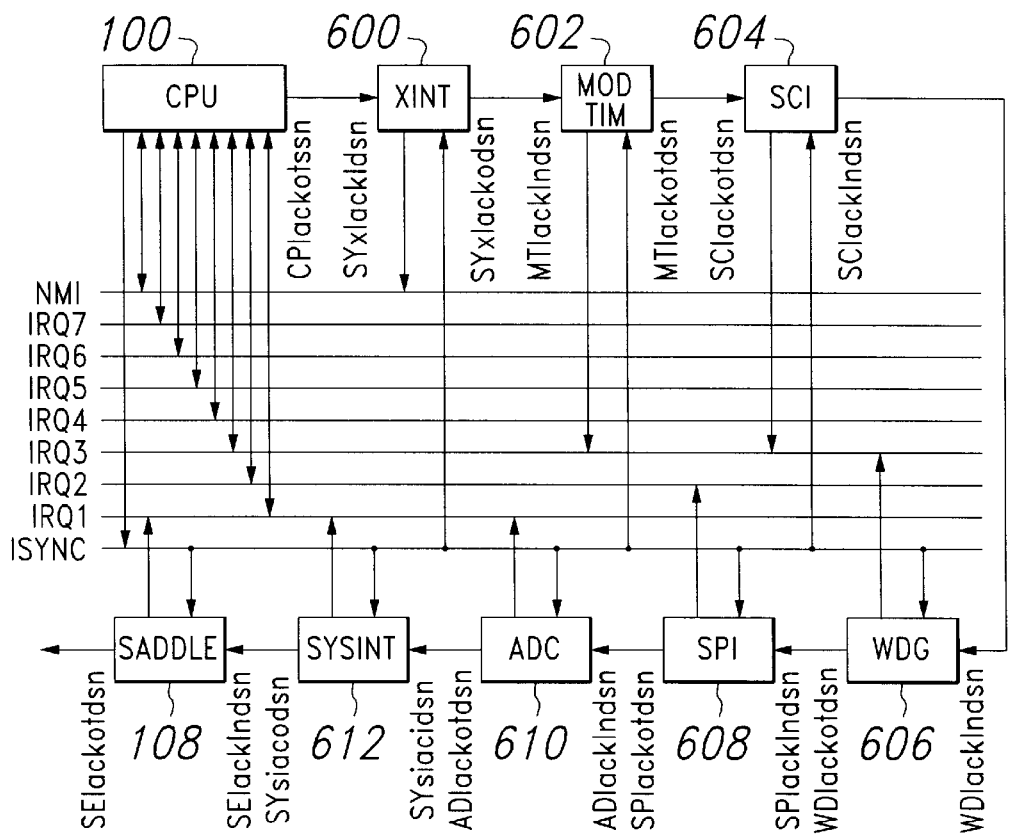
FIG. 6 is a block diagram of an interrupt structure of the IC of FIG. 1.

FIG. 6 is a block diagram of an interrupt structure of IC 10. Processor 100 is interconnected with a plurality of interrupt request signals IRQ1-7 and non maskable interrupt request signal NMI. Processor 100 has an interrupt masking circuit to selectively mask interrupt requests IRQ1-7. External interrupt circuit 600 is connected to signal NMI. Peripheral circuits 602, 604, 606, 608, and 610 are connected to various of request signals IRQ1-7, depending on the function of each peripheral. These peripheral circuits correspond to peripheral circuits 112–114 of FIG. 1. System interrupt circuit 612 comprises interrupt requests from various sources on IC 10. System interrupt circuit 612 is connected to interrupt request IRQ1. System interrupts are operational interrupts which invoke interrupt service routines, which are sequences of instructions, to provide processing service to the various peripheral circuits, as is well known.

Figure 7:
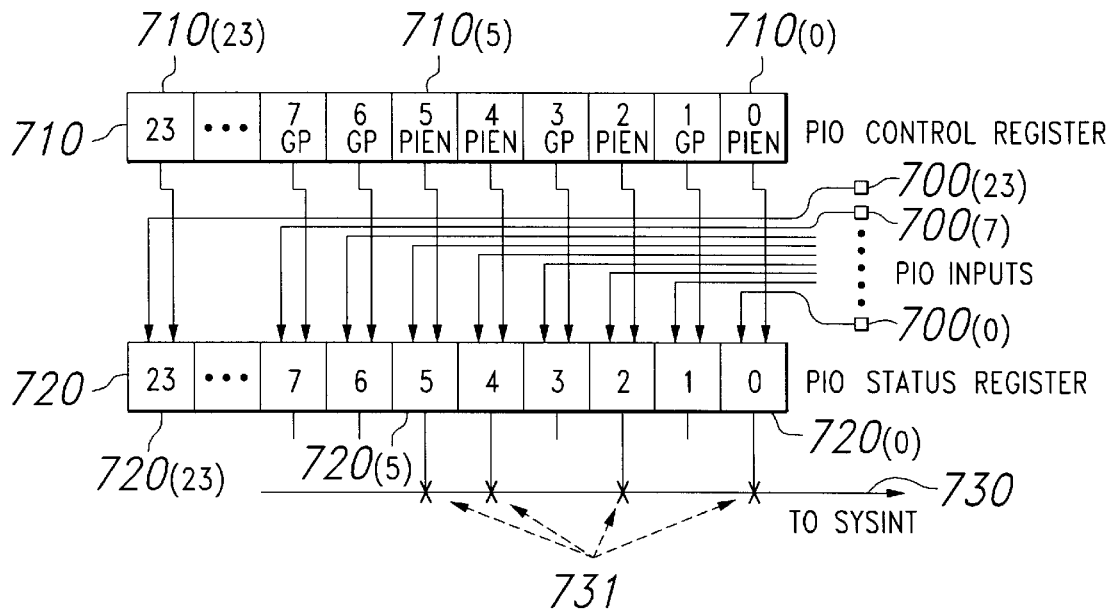
FIG. 7 is a partial schematic of circuitry in the IC of FIG. 1 to receive external interrupts and other signals.

FIG. 7 is a partial schematic of circuitry in IC 10 to receive external interrupts and other external signals. Input register 720 comprises a plurality of bits 720(0)–720(23). External pins 700(0)–700(23) are connected to respective bits of input register 720. Control register 710 comprises a plurality of bits 710(0)–710(23) which are connected to respective bits of input register 720. Control bits 710(n) function as enable bits such that a signal connected to an input of register 720 appears as an output of register 720 only if the corresponding control bit 710(n) is asserted. Signal 730 is connected to system interrupt circuit 612 and functions as a source of system interrupts. Selected bits of register 720 can be connected to signal 730, as indicated by connects 731. Thus, an external signal connected to pin 700(0), for example, may cause system interrupt signal 730 to be asserted, but only when control bit 710(0) is asserted. Likewise, an external signal connected to pin 700(5), for example, may cause system interrupt signal 730 to be asserted, but only when control bit 710(5) is asserted.

Figure 8:
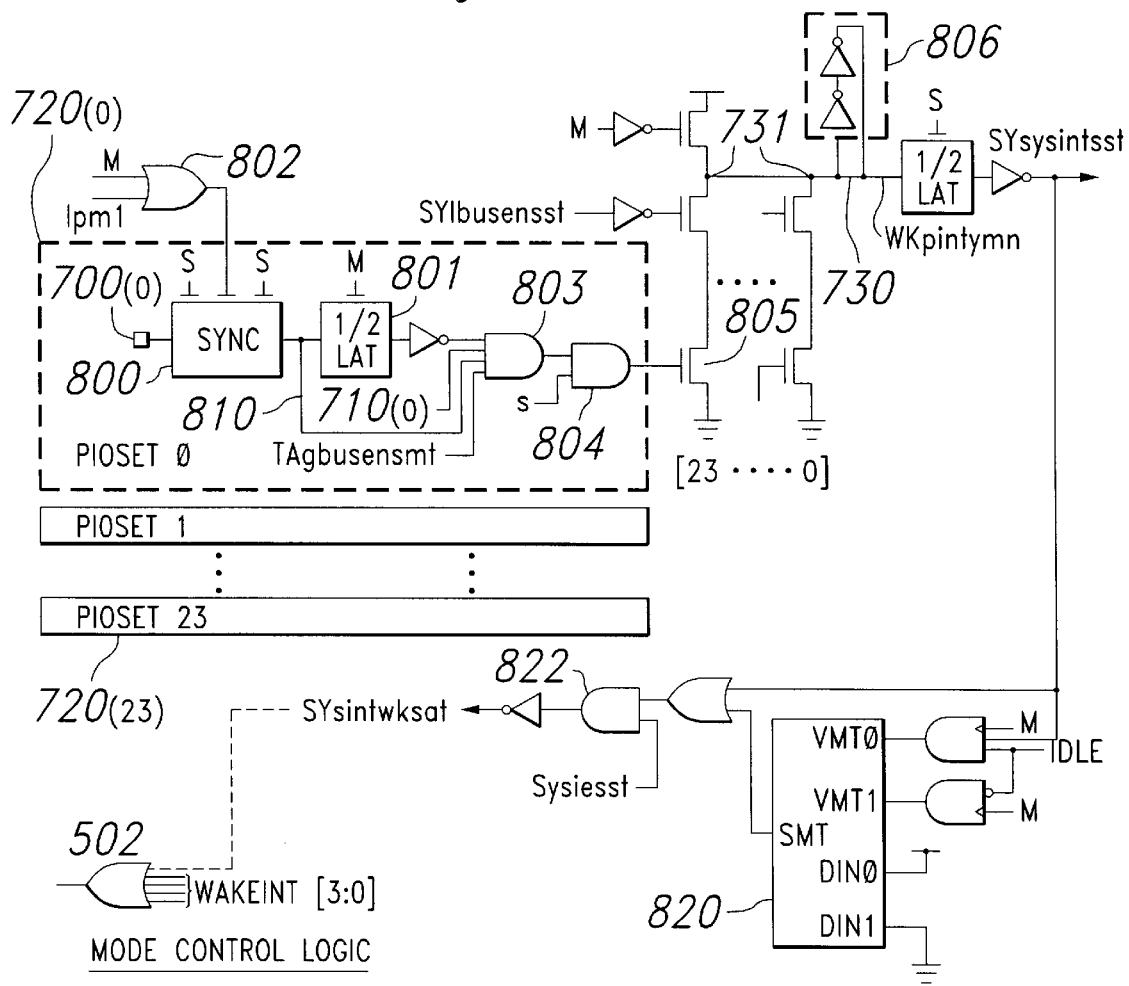
FIG. 8 is a schematic of the circuitry of FIG. 7 to allow interrupts to be provided to wakeup circuitry of FIG. 5, according to the present invention.

FIG. 8 is a schematic of the circuitry of FIG. 7 to allow interrupts to be provided to wakeup circuitry of FIG. 5, according to the present invention. Input register bit 720(0) is shown in detail and is representative of all the bits in input register 720. System clock 130 produces a master clock signal M and a slave clock signal S which are 180 degrees out of phase. Input synchronizer 800 is a two phase synchronizer, which is known in the art, which synchronizes a signal applied to pin 700(0) with system clock 130 in response to clock signals M and S. As described above, if a signal on pin 700(0) is asserted and control signal 710(0) is also asserted, then AND gate 804 will cause pull-down transistor 805 to pull signal 730 low which will assert system interrupt signal SYsysintsst.

According to a feature of the present invention, an interrupt signal on pin 700(0) could also be used as a wakeup interrupt. This is accomplished by connecting system interrupt signal SYsysintsst to NOR gate 502 so that a wakeup interrupt will occur whenever a system interrupt occurs if IC 10 is in low power mode 1. However, when IC 10 is in low power mode 1, system clock 130 is halted with clock signal M low and clock signal S high and synchronizer 800 is inoperable. Therefore, according to the present invention, signal LPM1 is connected to OR gate 802 so that synchronizer 800 will pass a signal from its input to its output while system clock 130 is stopped. Signal 810 bypasses latch 801, which is a second phase of synchronizer 800, and is connected to an input of AND gate 803. Keeper 806 functions to hold signal 730 in its last state between clock phases. RS latch 820 serves to hold wakeup signal SYsintwksat asserted until system clock 130 completes one cycle. Signals SYlbusensst and TAgbusensmt are bus enable signals which are used to disable buses during testing.

According to another feature of the present invention, system interrupt enable signal Sysiesst is connected to AND/OR gate 822. This is so that when system interrupts are disabled wakeup interrupts in response to system interrupts are also disabled. Thus, according to the present invention, a signal connected to pin 700(0) can cause both a wakeup interrupt and simultaneously a system interrupt. If interrupt request IRQ1 is masked, then only a wakeup interrupt will occur. If system interrupts are disabled, then neither a wakeup interrupt nor a system interrupt will occur in response to the signal on pin 700(0). Furthermore, a signal on any input pin 700(0)–(23) can cause a wakeup interrupt if a connection 731 is made for a corresponding input register bit as long as that bit is enabled by control register 710. Processor 100 can thus selectively enable only certain signals to cause wakeup interrupts by setting control register 710 accordingly prior to executing an IDLE instruction.

Figure 9:
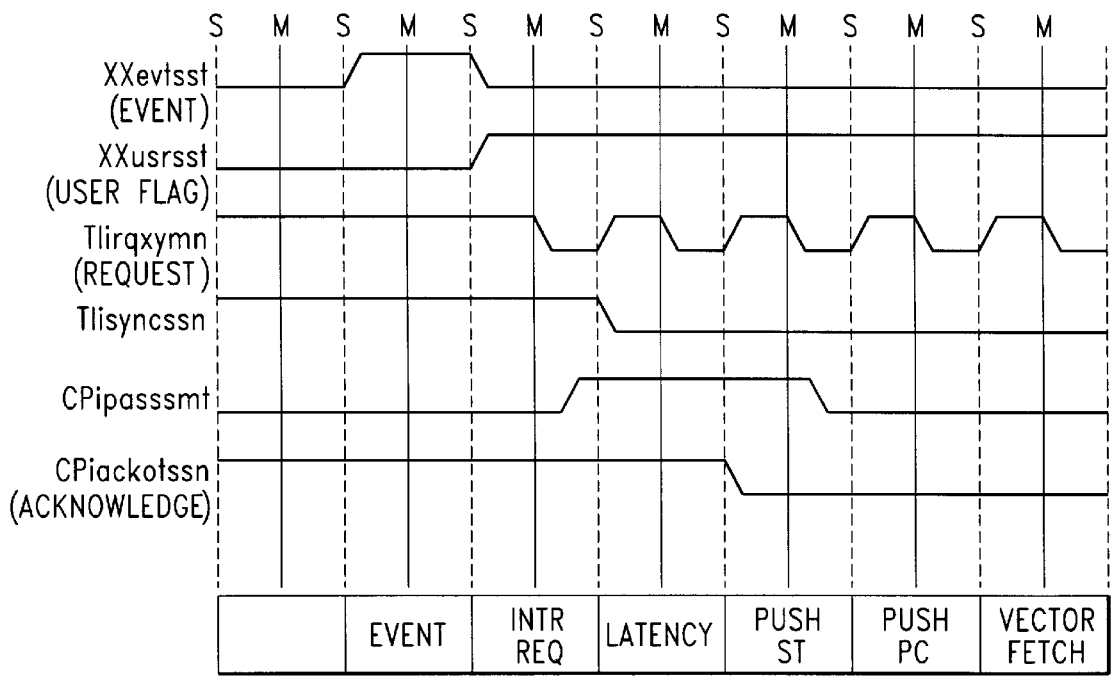
FIG. 9 is a timing diagram for interrupt operations when the IC of FIG. 1 is in full power mode.

FIG. 9 is a timing diagram for interrupt operations when IC 10 is in fill power mode. Signal XXevtsst represents an interrupt event responsive to a signal on input pin 700(xx). Signal Tlirqymn represents a signal on interrupt request line IRQ1.

Figure 10:
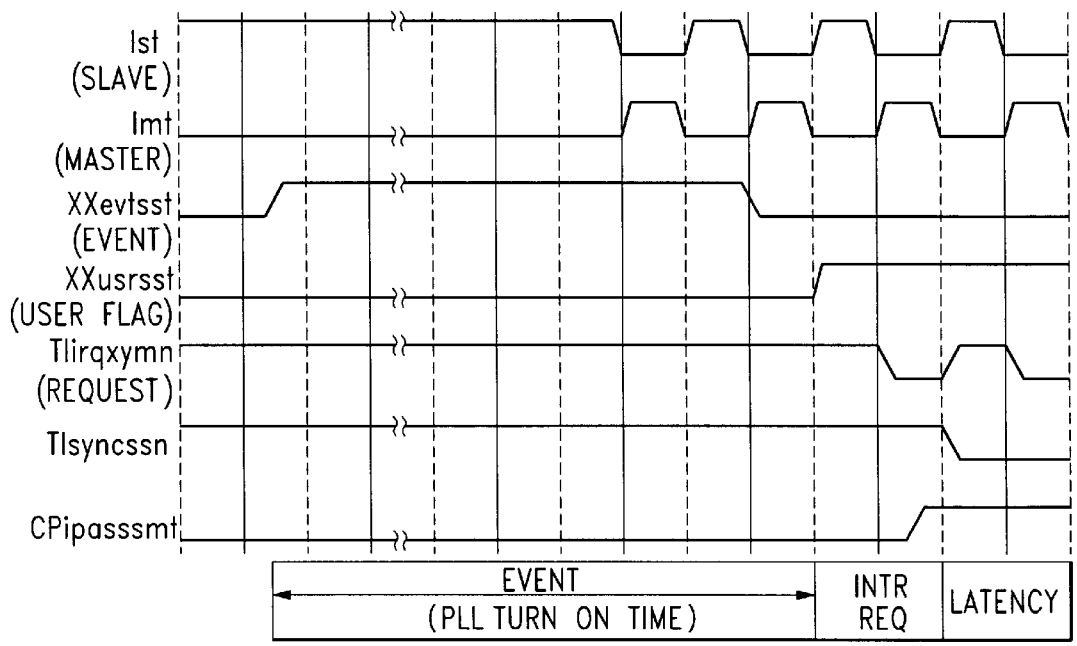
FIG. 10 is a timing diagram for interrupt operations when the IC of FIG. 1 is in standby mode.

FIG. 10 is a timing diagram for interrupt operations when IC 10 is in standby mode. Signal 1st is the slave clock signal. Signal 1mt is the master clock signal. Signal Xxevtsst illustrates the effect of RS latch 820.

Figure 11:
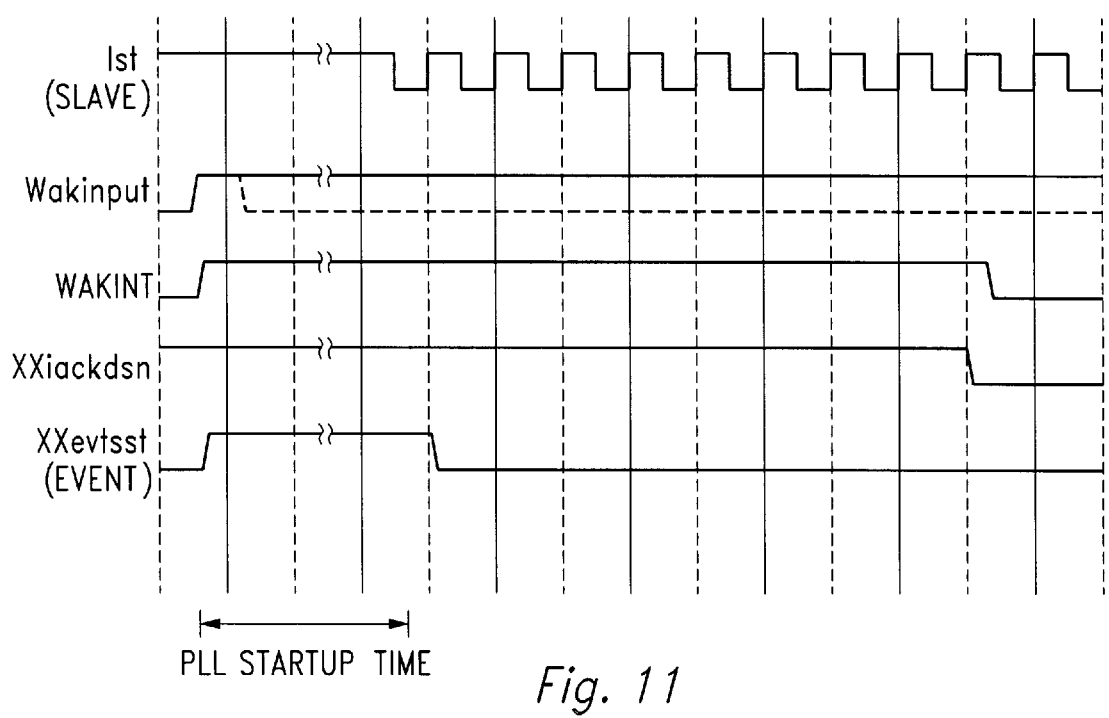
FIG. 11 is a timing diagram for wake-up interrupts for the IC of FIG. 1.

FIG. 11 is a timing diagram for wake-up interrupts for IC 10. Signal Wakinput represents a signal on an input pin 700(xx). Due to the action of keeper 806, signal Wakinput may be deasserted prior to the startup of system clock 130.

Another embodiment of the present invention connects an output of a bit 720(n) of input register 720 to one or more of peripherals 112–114 so that a function can be performed by the peripheral in response to an external signal connected to a pin 700(n) corresponding to the input register bit 720(n) while IC 10 is in low power mode. When IC 10 is in full power mode, a signal on pin 700(n) can cause a different response within IC 10.

Another embodiment of the present invention connects an output of a bit 720(n) of input register 720 to NOR gate 400 so that a reset occurs in response to signal on pin 700(n) when IC 10 is in low power mode, but the signal on bit 700(n) performs an operational function to transfer data or control information between the integrated circuit and an external device when IC 10 is in full power mode, advantageously allowing additional wakeup reset signals to be provided to the integrated circuit from various external devices without adding pins to the integrated circuit.

An advantage of the present invention is that an external signal that causes an operational interrupt in IC 10 can also cause IC 10 to wakeup from a low power mode and then service the interrupt by executing an interrupt service routine. The interrupt service routine can interrogate status register 720 or wakeup reset bit 406 to determine if the current interrupt is in response to a wake up signal and perform different processing if the interrupt is in response to a wakeup signal from normal operational processing if the interrupt is not in response to a wakeup signal.

Another advantage of the present invention is that multiple signals can be configured to cause wakeup interrupts or wakeup resets without requiring additional pins.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for waking up an integrated circuit from a low power mode which comprises:

providing said integrated circuit with a first pin for receiving an interrupt signal from an external source;

providing an input buffer within said integrated circuit to receive said interrupt signal which is connected to said first pin and to form a buffered interrupt signal;

treating said buffered interrupt signal as an operational interrupt when said integrated circuit is in said full power mode;

selectively masking said buffered interrupt signal so that said operational interrupt is ignored when said integrated is in full power mode and said buffered interrupt signal is masked; and treating said buffered interrupt signal as a wake up signal when said integrated circuit is in said low power mode and returning said integrated circuit to a full power mode in response to said wake up signal whether said buffered interrupt signal is masked or unmasked, so that a second pin is not required to provide said wake up signal.

2. The method of claim 1, further comprising:

responding to said operational interrupt in a first predetermined manner when said buffered interrupt signal occurs when said integrated circuit is in said low power mode; and responding to said operational interrupt in a second predetermined manner when said buffered interrupt signal occurs when said integrated circuit is in said full power mode.

3. The method of claim 2, further comprising:

providing circuitry to indicate if said buffered interrupt signal occurred when said integrated circuit is in said low power mode which can be interrogated by an interrupt service routine in response to said operational interrupt.

4. The method of claim 1, further comprising:

placing said integrated circuit in said low power mode by executing an Idle instruction which causes said integrated circuit to stop processing instructions; and resuming instruction processing at an instruction following said Idle instruction when said integrated circuit is returned to said full power mode.

5. The method of claim 1, further comprising:

increasing the frequency of a system clock in response to said wake up signal to place said integrated circuit in said full power mode.

6. The method of claim 1, wherein:

said providing a pin step provides said integrated circuit with a first plurality of pins for receiving a plurality of interrupt signals from a plurality of external sources;

said providing a buffer step provides a plurality of input buffers to receive said plurality of interrupt signals which are connected to said first plurality of pins and forms a plurality of buffered interrupt signals;

said interpreting step interprets a portion of said buffered interrupt signals as a plurality of wake up signals when said integrated circuit is in said low power mode and returns said integrated circuit to a full power mode in response to any of said wake up signals; and said treating step treats said buffered interrupt signals as a plurality of operational interrupts when said integrated circuit is in said full power mode so that a second plurality of pins is not required to provide said plurality of wake up signals.

7. A method for waking up an integrated circuit from a low power mode which comprises:

providing said integrated circuit with a first pin for receiving a first signal from an external source;

providing an input buffer within said integrated circuit to receive said first signal which is connected to said first pin and to form a buffered first signal;

providing circuitry within said integrated circuit to establish and maintain a first low power mode and a second low power mode;

interpreting said buffered first signal as a wake up reset signal when said integrated circuit is in one at said first low power mode or said second low power mode and returning said integrated circuit to a full power mode in response to said wake up reset signal;

treating said buffered first signal as an operational signal for control or data when said integrated circuit is in said full power mode so that a second pin is not required to provide said wake up signals;

providing a second pin and buffer operational within said integrated circuit to send and receive a system reset signal to external components;

resetting only said integrated circuit in response to said wake up reset signal if said integrated circuit is in said first low power mode; and resetting said integrated circuit and driving said second pin in response to said wake up reset signal if said integrated circuit is in said second low power mode.

8. An integrated circuit which has a first low power mode, a second low power mode and a full power mode, comprising:

a plurality of buffers connected to a plurality of pins for receiving data or interrupt signals from an external source;

first circuitry connected to said plurality of buffers for performing an operational function in response to said data or interrupt signals;

clock circuitry for providing a system clock signal within said integrated circuit; said clock circuitry being operational to operate in said full power mode and operational to operate in said first low power mode and said second low power mode;

operational circuitry connected to said clock circuitry which directs said clock circuitry to enter a selected one of said first low power mode or said second low power mode;

second circuitry connected to at least one of said plurality of buffers for forming a wakeup signal in response to said data or interrupt signal only when said integrated circuit is in one of said first low power mode or said second low power mode; said second circuitry operational to direct said system clock to enter said full power mode only when said integrated circuit is in one of said first low power mode or said second low power mode;

a reset pin and reset buffer operational to send and receive a global reset signal to external components:

reset circuitry connected to said reset buffer being operational to reset said integrated circuit and operational to direct said system clock to enter said full power mode in response to an external reset signal on said reset pin;

mode circuitry to establish and maintain a first low power mode and a second low power mode;

first mode reset circuitry connected to said mode circuitry and to said second circuitry to form a CPU reset signal in response to said wakeup signal if said first low power mode is asserted; and second mode reset circuit connected to said mode circuitry and to said second circuitry to form said CPU reset signal and connected to said reset buffer to form said global reset signal in response to said wakeup signal fi said second low power mode is asserted.

9. The integrated circuit of claim 8, wherein:

said plurality of buffers further comprises:
 a plurality of latches for storing said data or interrupt signals;
 a plurality of control bits connected respectively to said plurality of latches, each of said latches being able to assert an output signal only when said respective control bit is asserted;

said first circuitry further comprises interrupt circuitry connected to at least one of said latches and operational to form a system interrupt signal; and said second circuitry further comprises wakeup interrupt circuitry having at least one input connected to a same one of said latches as said first circuitry.

10. The integrated circuit of claim 8, further comprising:

a peripheral circuit connected to said system clock signal being responsive to said system clock signal to operate in a low power mode and in a full power mode.

11. The integrated circuit of claim 8, wherein a first buffer of said plurality of buffers further comprises synchronizer circuitry connected to a first pin of the plurality of pins, operable to synchronize a first signal received on said first pin to said system clock signal; and wherein said synchronizer circuitry further comprises bypass circuitry to pass said first signal through said synchronizer only when said system clock is halted in response to said low power mode.

* * * * *

UNITED STATES PATENT AND TRADEMARK OFFICE
CERTIFICATE OF CORRECTION

PATENT NO.     : 5,842,028
DATED          : November 24, 1998
INVENTOR(S)    : Vajapey It is certified that error appears in the above-identified patent and that said Letters Patent is hereby corrected as shown below:

Title page,
Item [60], Related U.S. Application Data, insert:
-- Related U.S. Application Data
Provisional application No. 60/005,472, Oct. 16, 1995 --.

Column 1,
Before line 5, insert -- This application claims priority under 35 U.S.C. §119(e)(1) of provisional application number 60/005,472, filed October 16, 1995. --

Signed and Sealed this

Twenty-first Day of June, 2005

JON W. DUDAS
*Director of the United States Patent and Trademark Office*